(No Model.)
A. SEARLS.
NUT LOCK.
No. 291,541. Patented Jan. 8, 1884.
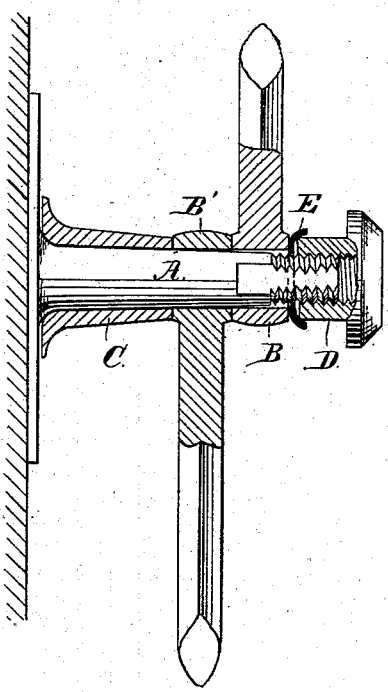
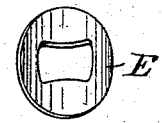
Witnesses:
Inventor
Anson Searls
by J. T. Fitch
his atty.

UNITED STATES PATENT OFFICE.

ANSON SEARLS, OF NEWARK, NEW JERSEY.

NUT-LOCK.

SPECIFICATION forming part of Letters Patent No. 291,541, dated January 8, 1884.

Application filed March 15, 1883. (No model.)

*To all whom it may concern:*

Be it known that I, ANSON SEARLS, residing in the city of Newark, in the county of Essex and State of New Jersey, have invented a new and useful Improvement in Nut-Locks, of which the following is a specification, reference being had to the accompanying drawings, forming part of the same.

Figure 1 is central longitudinal section of the middle hinge portion of a carriage-top prop on which is a nut-lock containing my invention; and Fig. 2 is a face view, slightly in perspective, of a spring-washer constituting the nut-lock, to be particularly described hereinafter.

My invention relates to a device that serves the double purpose of a spring-washer and a nut-lock; and it consists in the particular combination of devices hereinafter described and claimed. It is specially applicable to the joint-bar standard in carriage-top props, and I shall describe it in that connection.

A is the joint-bar standard of a carriage-top prop to a carriage-top. (Not shown.)

B B' are the ends of the joint-bars hinged on said standard, the latter passing through holes in the said bars in the usual way.

C is the usual collar, placed on the said standard and below the arms to keep the joint-bars in their proper position on the standard, which is provided at its outer end with a screw-thread and a nut, D, as is commonly done. If preferred, a shoulder may be formed on the standard in place of using the collar C.

E is a curved spring-washer, placed on the standard, (outside of the bar B,) which is prevented from turning on the stud, and down upon which the nut is screwed. A square or oblong hole is made in the washer, and the screw-threaded end of the stud is flattened somewhat, so that the washer cannot turn upon it.

I do not limit myself to the precise form of the screw-threaded end and of the central opening in the washer here described. Any equivalent form of these parts whereby the washer is prevented from turning on the screw may be employed. The washer is curved so as to form a portion of a cylinder, as seen in Fig. 2, and placed on the standard with its convex face next the bar B. The nut made square is a little less in size across its sides than the short diameter of the curved washer, as seen in Fig. 1; but still the nut, when screwed down, will spring the curved sides of the washer outward and downward, and thus apply a constant spring-pressure to the bars, effectually preventing their rattling.

It is obvious that when the nut is turned down, so as to spring the washer and bring two of the opposite sides of the nut parallel with the curved sides of the washer, the washer will act to lock the nut and prevent it from being turned back without the use of sufficient force to carry the corners of the nut over the edges of the curved sides of the washer. The washer thus constitutes at once a spring-tightener of the top-prop joint and a nut-lock.

I am aware that nut-locks have been made consisting of a curved spring-washer, the curved edges engaging the nut and preventing the latter from turning without turning the washer; but so far as I am aware all such spring-washer nut-locks have themselves been prevented from turning on the screw-bolt by engagement with something other than and separate from the bolt itself. Obviously such nut-locks can be used only where there is some stationary object with which the washer may engage. They cannot be used where there is no such stationary object—as, for example, on the top-prop described for securing the jointed bars B B' on the standard.

I disclaim all spring-washer nut-locks that are prevented from turning on the screw-bolt by engagement with anything separate from the bolt.

What I claim as my invention, and desire to secure by Letters Patent, is—

The combination, with the screw-threaded standard A, or its equivalent, provided with a flattened surface at its screw end, and the nut D, of the spring-washer E, the central opening of which is of oblong form or its equivalent, as and for the purpose described.

ANSON SEARLS.

In presence of—
A. G. N. VERMILYA,
P. B. VERMILYA.